United States Patent [19]
Nakashima et al.

[11] Patent Number: 5,819,589
[45] Date of Patent: Oct. 13, 1998

[54] BICYCLE BRAKE OPERATING DEVICE

[75] Inventors: Yuji Nakashima; Tsuyoshi Sakashita, both of Sakai, Japan

[73] Assignee: Shimano, Inc., Osaka, Japan

[21] Appl. No.: 795,104

[22] Filed: Feb. 5, 1997

Related U.S. Application Data

[63] Continuation-in-part of Ser. No. 611,931, Mar. 6, 1996, abandoned.

[30] Foreign Application Priority Data

Mar. 7, 1995 [JP] Japan ........................................ 7-47495

[51] Int. Cl.$^6$ ............................... B62K 23/06; B62L 3/02
[52] U.S. Cl. .................................. 74/489; 74/104; 74/516
[58] Field of Search .............................. 74/104, 489, 516, 74/517

[56] References Cited

U.S. PATENT DOCUMENTS

| | | | |
|---|---|---|---|
| 4,903,799 | 2/1990 | Romano | 188/20 |
| 5,279,179 | 1/1994 | Yoshigai | 74/502.2 |
| 5,448,927 | 9/1995 | Lumpkin | 74/502.2 |
| 5,528,954 | 6/1996 | Yoshigai | 74/489 |
| 5,660,082 | 8/1997 | Hsieh | 74/489 |
| 5,669,268 | 9/1997 | Tsai | 74/489 |

FOREIGN PATENT DOCUMENTS

| | | | |
|---|---|---|---|
| 0 389 931 A1 | 10/1990 | European Pat. Off. | B62L 3/02 |
| 0 435 248 A3 | 7/1991 | European Pat. Off. | B62L 3/02 |
| 0 435 248 B1 | 7/1991 | European Pat. Off. | B62L 3/02 |
| 0 731 019 A3 | 9/1996 | European Pat. Off. | B62L 3/02 |
| 1210326 | 3/1960 | France . | |
| 3-292280 | 12/1991 | Japan | B62L 3/02 |

OTHER PUBLICATIONS

European search report for EP 97300847.7, dated Aug. 11, 1997.

*Primary Examiner*—Allan D. Herrmann
*Attorney, Agent, or Firm*—James A. Deland

[57] ABSTRACT

A brake operating device includes a bracket for attachment to the bicycle, an operating lever pivotally supported on the bracket about a pivot point, and a guide having a path that extends toward the pivot point. An anchoring member is connected to the force transmission element and is disposed for movement along the path of the guide during operation of the operating lever. An adjustment mechanism is provided for adjusting a range of movement of the anchoring member along path of the guide.

30 Claims, 7 Drawing Sheets

BICYCLE BRAKE OPERATING DEVICE

CROSS REFERENCE TO RELATED APPLICATIONS

This application is a continuation-in-part of application Ser. No. 08/611,931 filed Mar. 6, 1996, now abandoned.

BACKGROUND OF THE INVENTION

The present invention is directed to bicycle brake operating devices and, more specifically, to a bicycle brake operating device where a pivoting lever is connected to a force transmission element for operating the bicycle brake.

Brake operating devices which are used to operate bicycle brake devices are usually mounted on the handlebars of bicycles. Generally, such brake operating devices have a bracket which can be attached to the handlebar, and an operating lever which is pivotally supported at one end on the bracket. A wire which is used to drive the brake device is anchored to the operating lever via an anchoring member.

Devices which are designed so that the operating force and operating stroke in such brake operating devices can be altered as desired by the operator have already been proposed. For example, such devices are designed so that the lever ratio can be altered by altering the distance between the center of rotation of the operating lever and the anchored portion of the wire. Here, the term "lever ratio" refers to the ratio L/h obtained by dividing the distance L between the center of rotation of the operating lever and the operating point (i.e., the point where the operator actually grips the operating lever and applied an operating force) by the distance h between the center of rotation and the wire anchoring point.

If it is desired to obtain a strong braking force, i.e., a strong wire pulling force, by means of a light operating force, it is necessary to increase the lever ratio. The lever ratio can be increased by changing the position of the wire anchoring point so that the distance between the center of rotation of the operating lever and the wire anchoring point is reduced. In this case, however, the pulling rate of the wire (i.e., the amount of movement of the wire relative to the operating angle of the operating lever) is reduced compared to a case where the lever ratio is small. If the pulling rate of the wire is reduced, the operating lever may contact the handlebar before the brake acts sufficiently.

Accordingly, devices which are designed so that the wire anchoring point can be altered during the brake operating process have been proposed, as disclosed in Japanese Laid-Open Patent Application No. H3-292280. In this device, the lever ratio varies with the operation of the operating lever. As a result, a large braking force can be obtained by means of a small operating force, while the pulling rate of the wire is maintained. Unfortunately, the rate of variation in the brake operating force during the brake lever operating process, and the final brake operating force, are determined in a fixed manner. Accordingly, the feeling of brake operation cannot be adjusted to suit the user.

SUMMARY OF THE INVENTION

The present invention is directed to a brake operating device wherein the rate of variation of the lever ratio may be adjusted so that the operating force and pulling rate of the brake wire can be adjusted to accommodate different users. In one embodiment of the present invention, a brake operating device includes a bracket for attachment to the bicycle, an operating lever pivotally supported on the bracket about a pivot point, and a guide having a path that extends toward the pivot point. An anchoring member is connected to the force transmission element and is disposed for movement along the path of the guide during operation of the operating lever. An adjustment mechanism is provided for adjusting a range of movement of the anchoring member along path of the guide.

The adjustment mechanism may take many different forms. For example, the adjustment mechanism may comprise a screw or some other stopper disposed along the path of the guide. The adjustment mechanism may also comprise a cover having a plurality of positioning locations for positioning over the guide, and a stopper for placement at a selected positioning location for limiting movement of the anchoring member along the guide.

In a more specific embodiment, the operating lever pivots between a first lever position and a second lever position. An angle formed by the axis and the force transmission element is an obtuse angle when the operating lever is disposed in the first lever position, and the angle formed by the axis and the force transmission element is an acute angle when the operating lever is disposed in the second lever position. The anchoring member is disposed in a first guide position when the operating lever is disposed in the first lever position, and the anchoring member is disposed in a second guide position when the operating lever is disposed in the second lever position. The brake lever is structured so that the anchoring member immediately moves from the first guide position to the second guide position when the angle formed by the axis and the force transmission element changes from an obtuse angle to an acute angle.

DETAILED DESCRIPTION OF THE EMBODIMENTS

Figure 1:
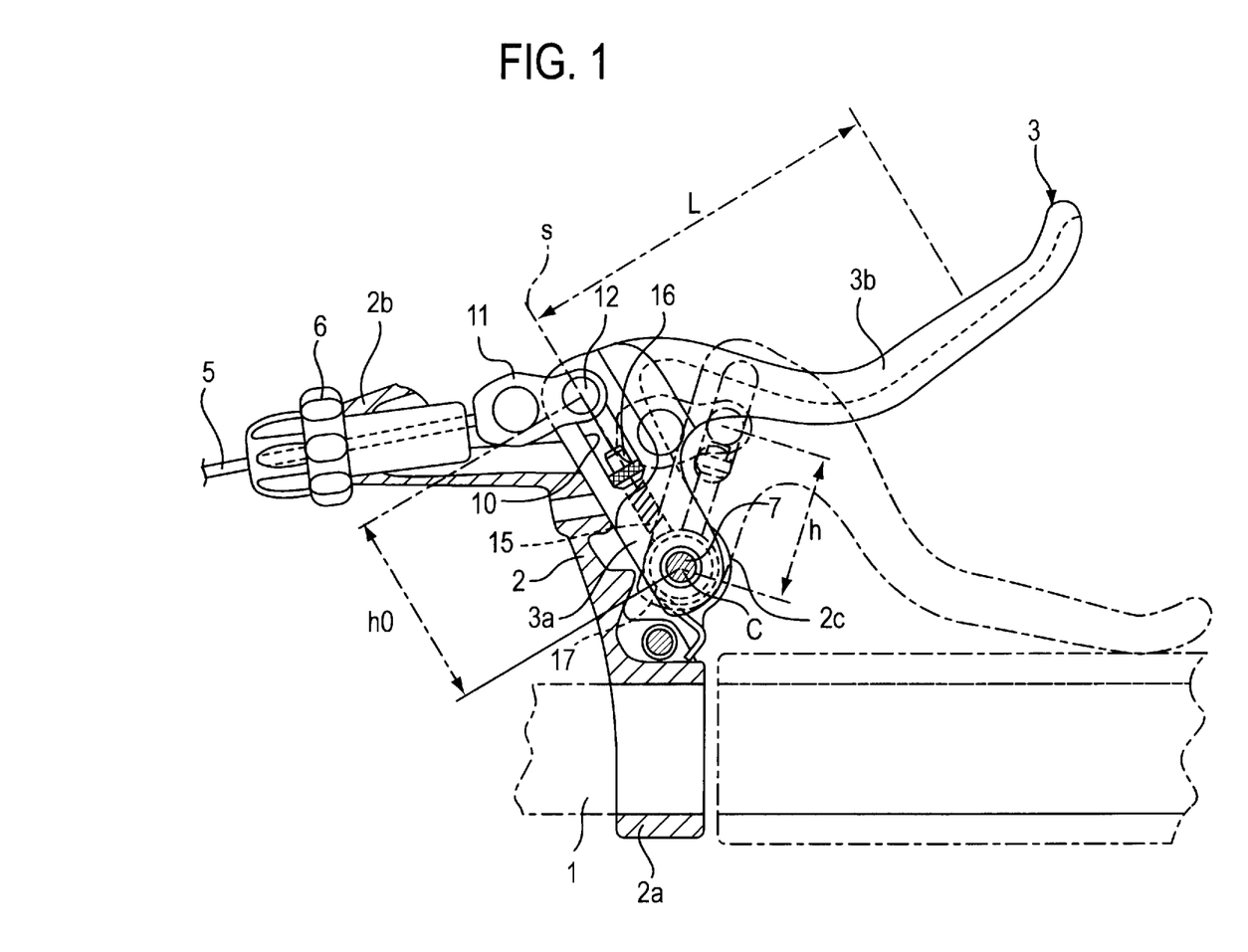
FIG. 1 is a plan view of a particular embodiment of a brake operating device according to the present invention.

FIG. 1 is a plan view of a particular embodiment of a brake operating device according to the present invention. The bicycle brake operating device shown in FIG. 1 has a bracket 2 which is attached to the handlebar 1 of a bicycle, and an operating lever 3 which is supported at one end on the bracket 2 so that the operating lever 3 is free to pivot. The bracket 2 is formed in a reverse "L" shape. A tubular portion 2a which is fitted over the handlebar 1 is formed on one end of the bracket 2, while a wire attachment portion 2b on which a wire supporting member 6 which is used to support a brake wire 5 is mounted is formed on the other end of the bracket 2. Furthermore, a lever supporting portion 2c which is used to support the operating lever 3 is formed in the vicinity of the tubular portion 2a.

The operating lever 3 has a supporting portion 3a, one end of which is supported by the lever supporting portion 2c of the bracket 2 so that the operating lever 3 is free to pivot, and an operating portion 3b which extends toward the side from the other end of the supporting portion 3a. The supporting portion 3a is attached to the bracket 2 by means of a pin 7. A slot 10 which extends toward the center of rotation C of the operating lever 3 is formed in the supporting portion 3a. The center line of this slot 10 (with respect to the width of the slot) intersects the center of rotation C. A wire anchoring member 11 is slidably disposed in the slot 10 of the operating lever 3 via an anchoring pin 12. The end portion of a brake wire 5 is anchored to the wire anchoring member 11.

A screw hole 15 which extends toward the center of rotation C from one end of the slot 10 is formed in the operating lever 3, and a screw 16 is screwed into this screw hole 15. The head portion of the screw 16 protrudes into the slot 10. In this way, an adjustment mechanism is formed by the screw hole 15 and screw 16, so that the range of movement of the wire anchoring member 11 inside the slot 10 can be adjusted by adjusting the amount of protrusion of the screw 16 into the slot 10.

A return spring 17 is installed around the center of rotation of the operating lever 3. One end of this return spring 17 is anchored to the bracket 2, while the other end is anchored to the operating lever 3. Return spring 17 causes the operating lever 3 to be constantly driven toward its initial attitude (i.e., the attitude indicated by the solid line in FIG. 1).

Figure 2:
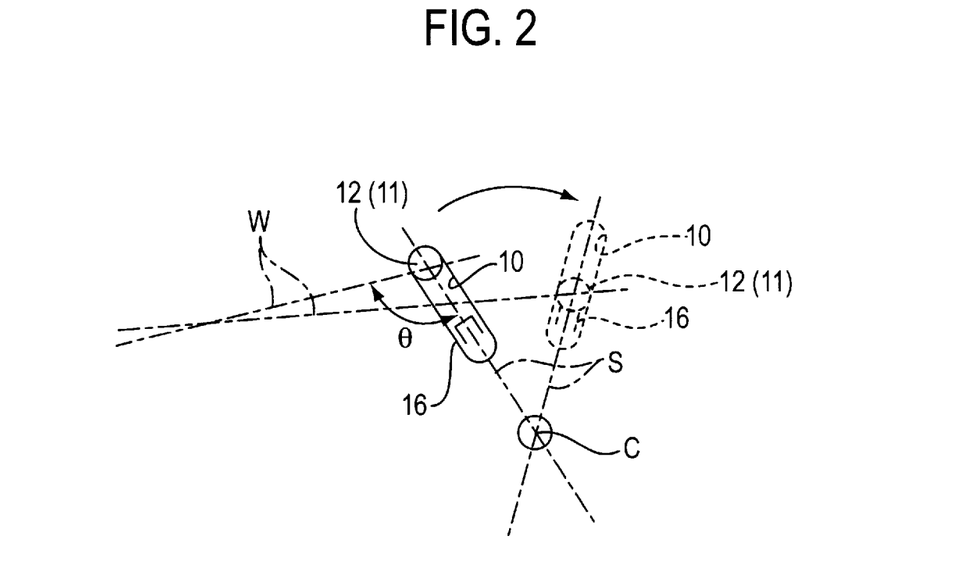
FIG. 2 is a schematic view illustrating the operation of the brake operating device shown in FIG. 1.

The operation of the above device will be described with reference to FIG. 2. As shown in FIG. 2, the center line of the brake wire 5 is W, the center line of the slot 10 (with respect to the width of the slot) is S, and the angle formed by the center lines W and S is θ. When the operating lever 3 is not being operated, the pin 12 of the wire anchoring member 11 (hereafter referred to simply as the "wire anchoring member 11") is positioned at the most distant position from the center of rotation C inside the slot 10, as shown by the solid lines in FIGS. 1 and 2. In this state, as is shown in FIG. 1, the lever ratio is $L/h_0$, where L is the distance from the center of rotation C to the operating position (with respect to the operating lever 3), and $h_0$ is the distance from the center of rotation C to the position of the wire anchoring member 11. This lever ratio $L/h_0$ is the smallest lever ratio that can be adopted by the present device. Furthermore, the angle θ formed by the center line W and center line S is an obtuse angle.

When the operating lever 3 is pulled toward the handlebar 1, the brake wire 5 is pulled so that the brake shoes approach the rim of the wheel. In this case, the angle θ in FIG. 2 approaches 90 degrees. Until θ reaches 90 degrees, the wire anchoring member 11 remains positioned at one end of the slot 10. Accordingly, the lever ratio is small and the brake wire pulling rate is large. As the operation of the operating lever 3 is continued so that θ reaches and then exceeds 90 degrees, the wire anchoring member 11 moves along the slot 10 toward the center of rotation C. Then, when the wire anchoring member 11 contacts the tip of the screw 16, this movement stops. If the distance between the wire anchoring member 11 and center of rotation C at this point is taken as h (as shown in FIG. 1), then the lever ratio in this state is L/h. Since $h<h_0$, the lever ratio in the latter half of the braking operation is greater than the initial lever ratio. Accordingly, in this latter half of the braking operation, a large braking force can be obtained by applying a small operating force.

Another advantage of the different brake cable pulling rates and lever ratios is that the clearance between the brake shoes and the wheel rim may be maximized in the inoperative state while still providing a large mechanical advantage when the brake shoes contact the rim. Greater clearance between the brake shoes and the wheel rim facilitates assembling the wheel to the frame and accommodates wheels that wobble or are not perfectly true. The large cable pulling rate during initial operation of the brake lever effectively takes up the large clearance between the brake shoes and the wheel rim, and the large lever ratio during the latter phase of operation of the brake lever provides the desired braking force to the wheel rim. All of this is accomplished without requiring a larger lever stroke.

Next, in cases where the operating force is to be altered, the screw 16 is adjusted so that the amount of protrusion of the screw 16 into the slot 10 is altered. This adjustment makes it possible to adjust h in FIG. 1, so that the final lever ratio in the operating process 10 (hereafter referred to as the "final lever ratio") can be freely varied as desired by the operator, etc. Specifically, if the amount of protrusion of the screw 16 into the slot 10 is increased, h becomes relatively larger, so that the final lever ratio becomes relatively smaller. In this case, the wire pulling rate becomes relatively large, but the required operating force becomes heavier. Conversely, if the amount of protrusion of the screw 16 into the slot 10 is reduced, h becomes relatively smaller, so that the final lever ratio becomes relatively larger. In this case, a large braking force can be obtained by applying a small operating force.

Figure 3:
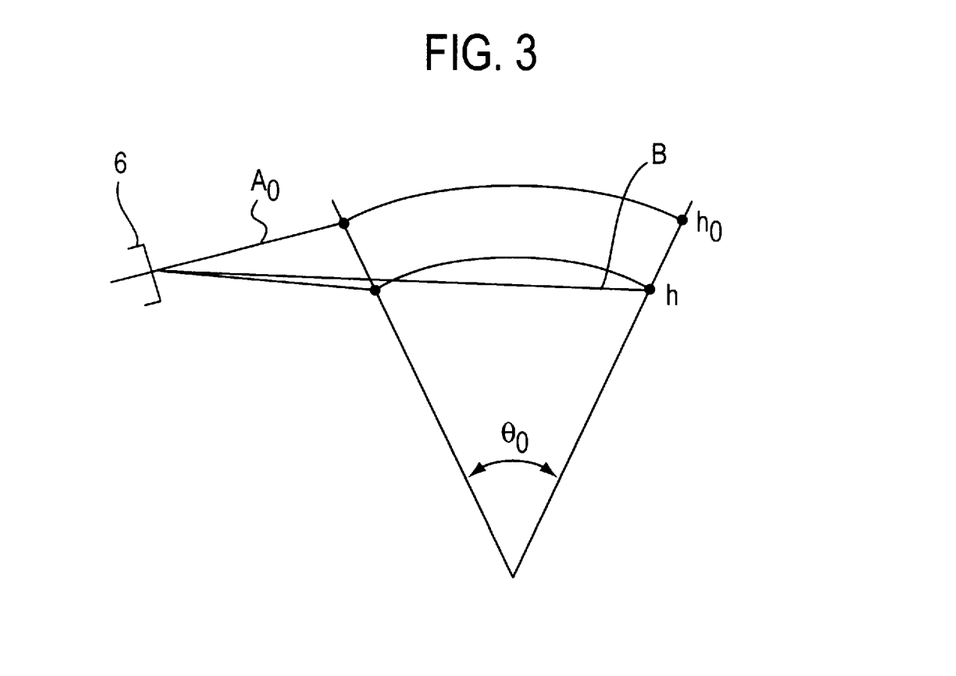
FIG. 3 is a schematic view illustrating the wire pulling rate of the brake operating device shown in FIG. 1.

The brake wire pulling rate will be described with reference to FIG. 3. In FIG. 3, the overall operating angle of the operating lever is 60. In this case, when the wire anchoring member 11 moves during the braking operation and stops in the position of h (h representing the distance between the wire anchoring member 11 and the center of rotation C), the final amount of protrusion of the brake wire 5 from the supporting member 6 is B. Furthermore, the amount of protrusion of the brake wire 5 from the supporting member 6 in the initial state prior to the initiation of the braking operation is $A_0$. In this case, the brake wire pulling rate is $(B-A_0)$.

As is clear from the above description, a large brake wire pulling rate can be assured by minimizing the amount of protrusion $A_0$ of the wire in the initial state. Specifically, in the initial state, the position of the wire anchoring member 11 inside the slot 10 is set so that the position is distant from the center of rotation C. In this embodiment, the respective members are installed so that the center line W and center line S in FIG. 2 are perpendicular to each other.

Figure 4:
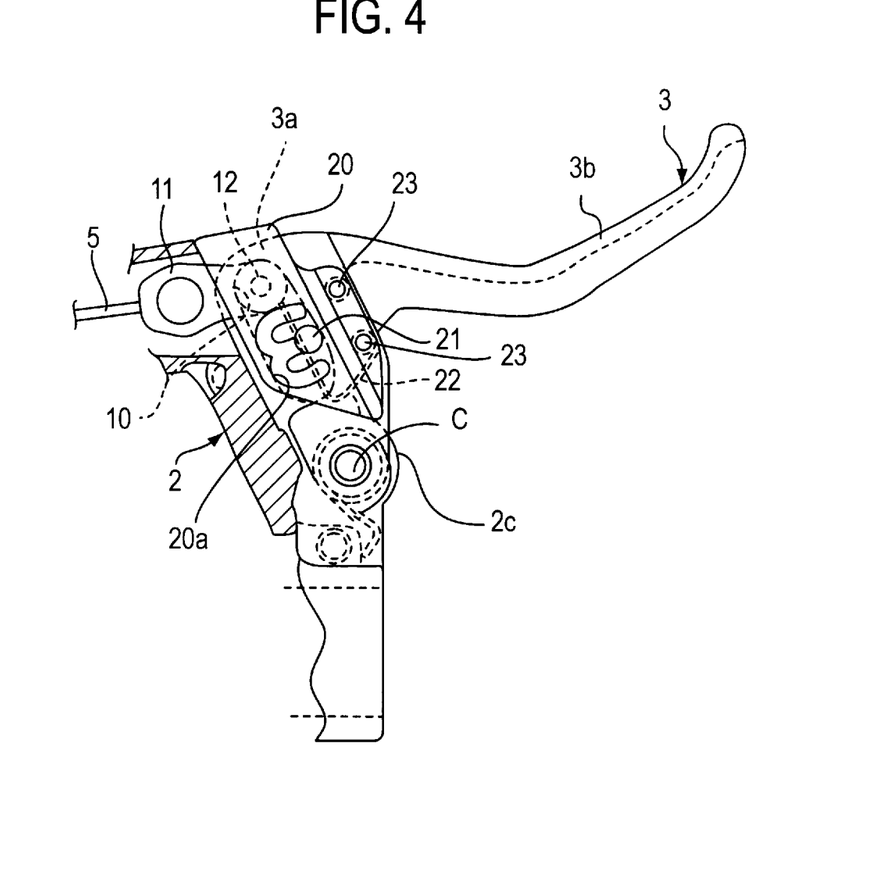
FIG. 4 is a plan view of an alternative embodiment of a brake operating device according to the present invention.
Figure 5:
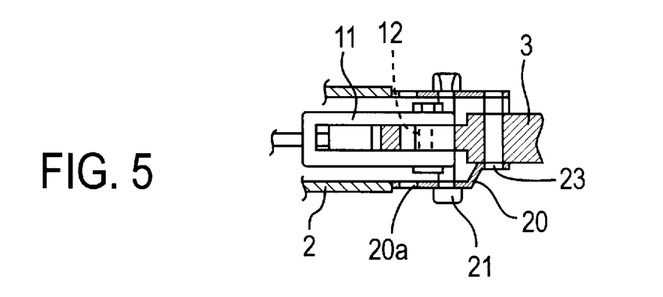
FIG. 5 is a cross sectional view of a particular embodiment of an adjustment mechanism shown in FIG. 4.

A second embodiment of the present invention is illustrated in FIGS. 4 and 5. In this embodiment, only the adjustment mechanism which adjusts the range of movement of the wire anchoring member differs from that of the above mentioned first embodiment. The remaining structure is similar to that of the first embodiment. Accordingly, only the construction of the adjustment mechanism will be described below.

The adjustment mechanism in this embodiment includes a covering member 20 and a pin 21. Covering member 20 is mounted on the supporting portion 3a of the operating lever 3 so that the covering member 20 covers the slot 10 from the outside. The covering member 20 has a U-shaped cross section so that the covering member 20 can clamp the supporting portion 3a of the operating lever 3 from both sides. Respective "m"-shaped positioning grooves 20a are formed in both side surfaces of the covering member 20. The respective end portions of the grooves 20a act as positioning portions. The pin 21 is mounted so that it passes through the "m"-shaped grooves 20a formed in both side surfaces of the covering member 20, and through the slot 10, and so that the pin 21 can move through the "m"-shaped positioning grooves 20a. Furthermore, a fastening spring 22 is provided so that the pin 21 can be maintained in the respective positioning portions located in the end portions of the grooves 20a.

In this embodiment, the pin 21 moves through the grooves 20a, and is positioned in the respective end portions of the grooves 20a. As a result, the range of movement of the wire anchoring member 11 inside the slot 10 can be adjusted in three steps. Specifically, when the pin 21 is fastened in place in the end portions of the "m"-shaped positioning grooves 20a that are farthest from the center of rotation C, h in the first embodiment has the largest value, so that the final lever ratio has the smallest value in the adjustable range of values. On the other hand, when the pin 21 is positioned closest to the center of rotation, h has the smallest value, so that the final lever ratio has the maximum value. Thus, the final lever ratio can be adjusted in a simple manner merely by moving the pin 21. Furthermore, if the covering member 20 is replaced by a covering member which has different grooves, the final lever ratio can be adjusted using a different adjustment pattern.

Figure 6:
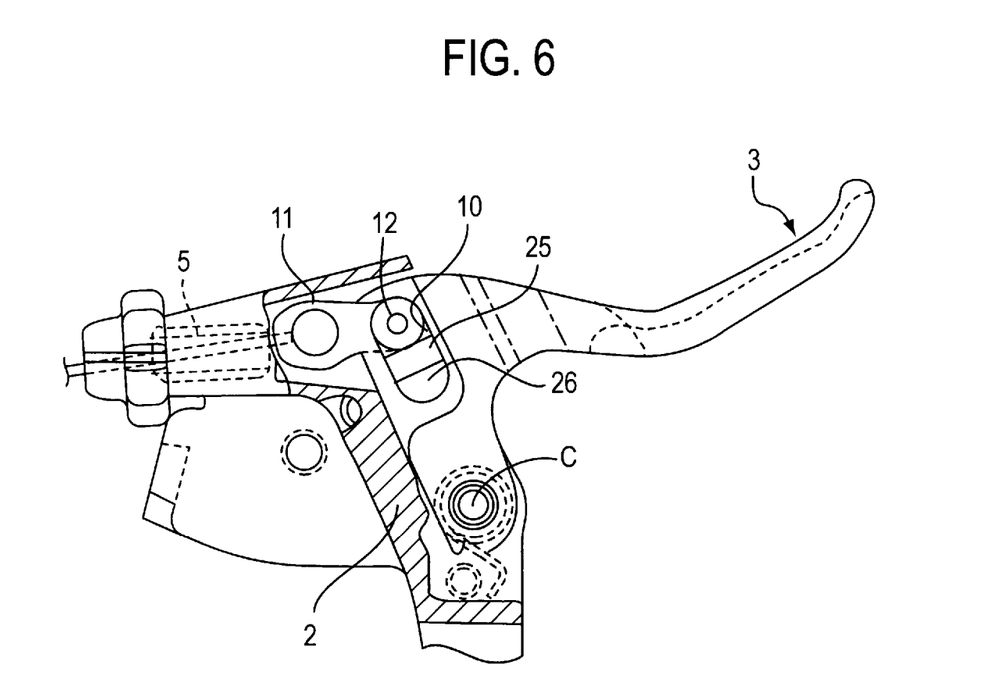
FIG. 6 is a plan view of another embodiment of a brake operating device according to the present invention.

FIG. 6 illustrates a third embodiment of the present invention. In this embodiment, only the adjustment mechanism differs from that of the first embodiment. The remaining structure is similar to that of the first embodiment. The adjustment mechanism in this embodiment is a stopper formed from two resin members 25, 26 which are inserted into the slot 10 of the operating lever 3. These resin members 25, 26 possess resiliency, and have a width which is greater than the width of the slot 10 prior to the insertion of the resin members 25, 26 into the slot 10. These resin members 25, 26 are fastened in prescribed positions inside the slot 10 by being pushed into the slot 10 so that the range of movement of the wire anchoring member 11 inside the slot 10 may be adjusted.

If both of the two resin members 25, 26 are inserted into the slot 10, the range of movement of the wire anchoring member 11 is extremely restricted. Specifically, this range of movement consists of the total range obtained by combining the slight gap between the wire anchoring member 11 and the resin member 25, and the amount of elastic deformation of both resin members 25, 26 that occurs when the wire anchoring member 11 contacts the resin members 25, 26. In this case, h in the embodiment is large, so the final lever ratio is small. This ensures a sufficient wire pulling rate. If the resin member 25 is removed, the range of movement of the wire anchoring member 11 is increased, so that the final lever ratio becomes relatively larger. In this case, a large braking force can be obtained by applying a small operating force.

In this embodiment, the adjustment mechanism can be realized using simple portions. Furthermore, by preparing various types of resin members, it is possible to alter the operating force and stroke in a simple and inexpensive manner.

FIGS. 7A–7D are views of a fourth embodiment of a brake operating device according to the present invention. In this embodiment, a slot 50 has a straight first slot portion 54 and an angled second slot portion 58 disposed at an upper end of first slot portion 54. First slot portion 54 is formed at an angle to an axis R extending radially from the center of rotation C, but such an angled orientation is not necessary, and first slot portion 54 may align with the axis R as with the other embodiments, if desired. An adjustment mechanism in the form of a rigid stopper 62 may be removably fitted within slot 50. More specifically, stopper 62 is disposed within first slot portion 54 and includes a first surface 66 for preventing anchoring member 11, when anchoring member is disposed within second slot portion 58, from entering first slot portion 54. As a result, anchoring member 11 is retained within second slot portion 58, as shown in solid lines in FIG. 7A. In this embodiment, second slot portion 58 is sized so that anchoring member does not move along the path of the slot when retained therein. Similarly, stopper 62 includes a second surface 70 for defining a retaining opening 74 which retains anchoring member 11 at the lower end of first slot portion 54 as shown in broken lines in FIG. 7A. In this embodiment, as with second slot portion 58, retaining opening 74 is sized so that anchoring member 11 does not move along the path of the slot when retained within retaining opening 74. If desired, stopper 62 may be retained to brake lever 3 through a retaining screw 78 which threads into an opening 82 in stopper 62, or else stopper 62 may be formed to frictionally fit within first slot portion 54.

Figure 7A:
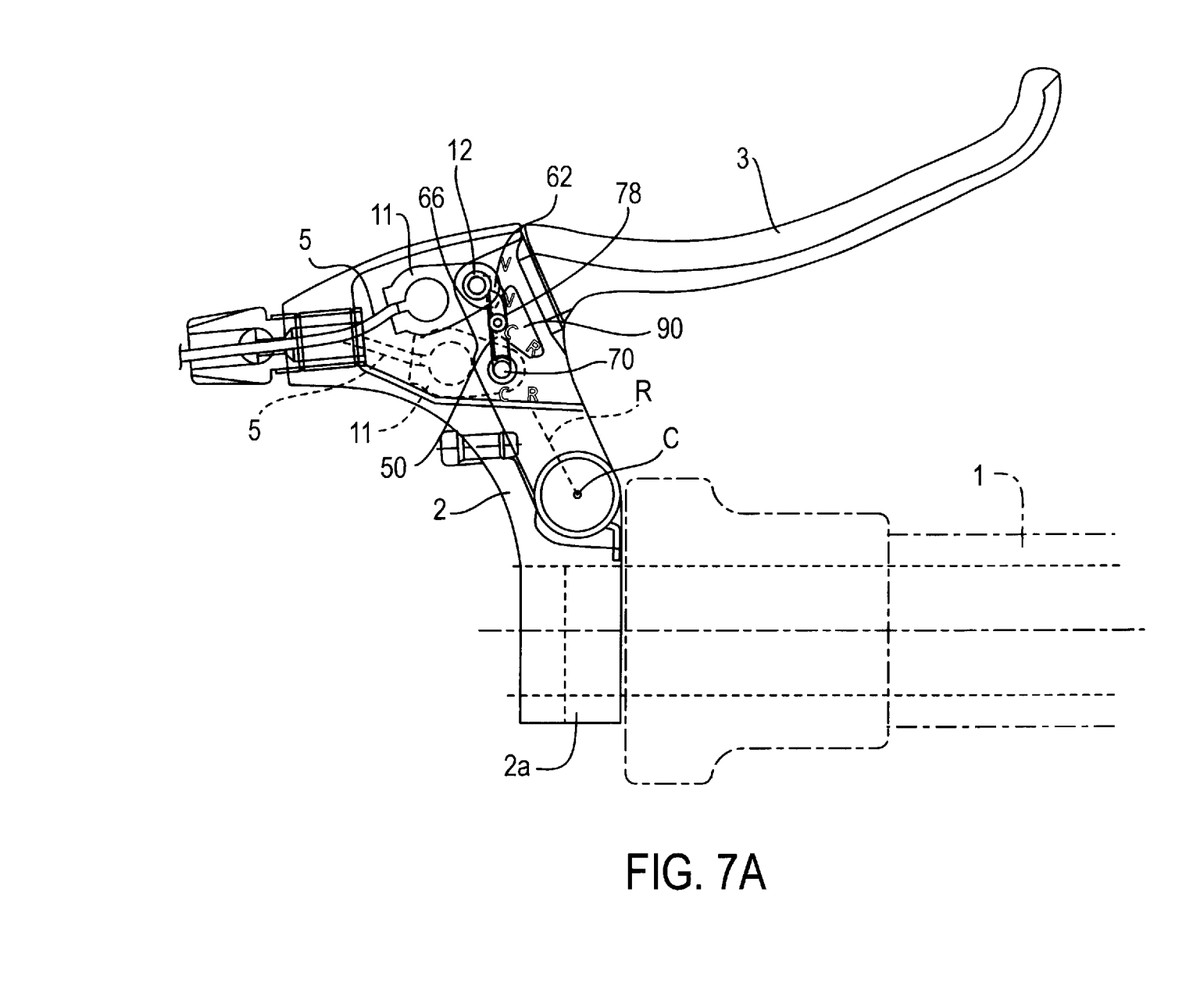
FIGS. 7A–7D are views of another alternative embodiment of a brake operating device according to the present invention.
Figure 7B:
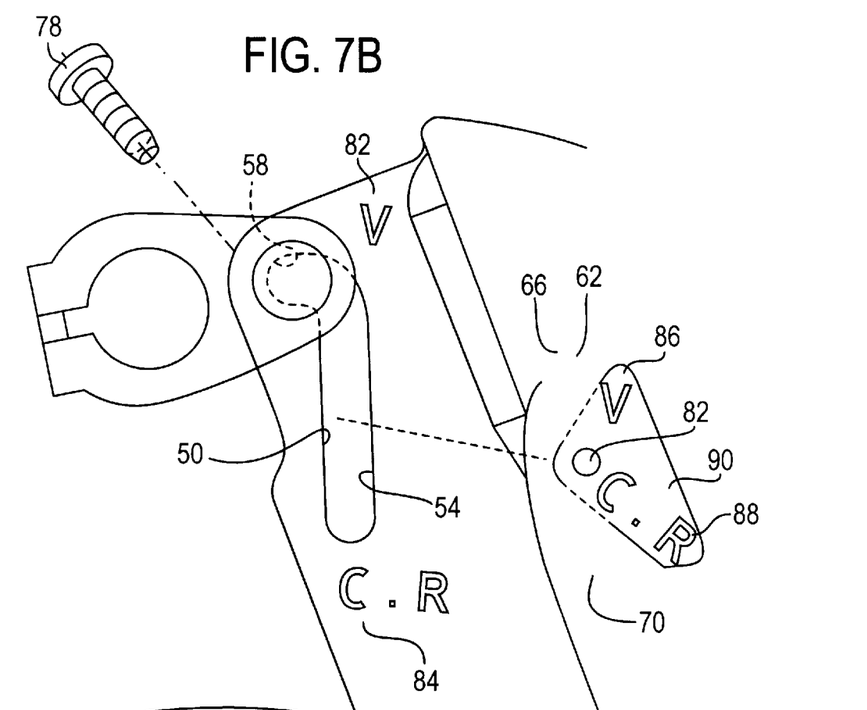
Figure 7C:
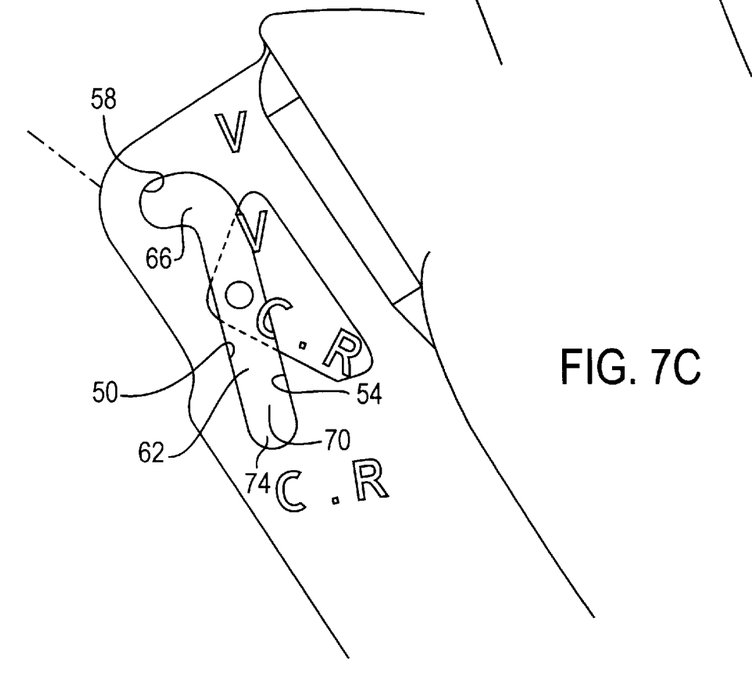
Figure 7D:
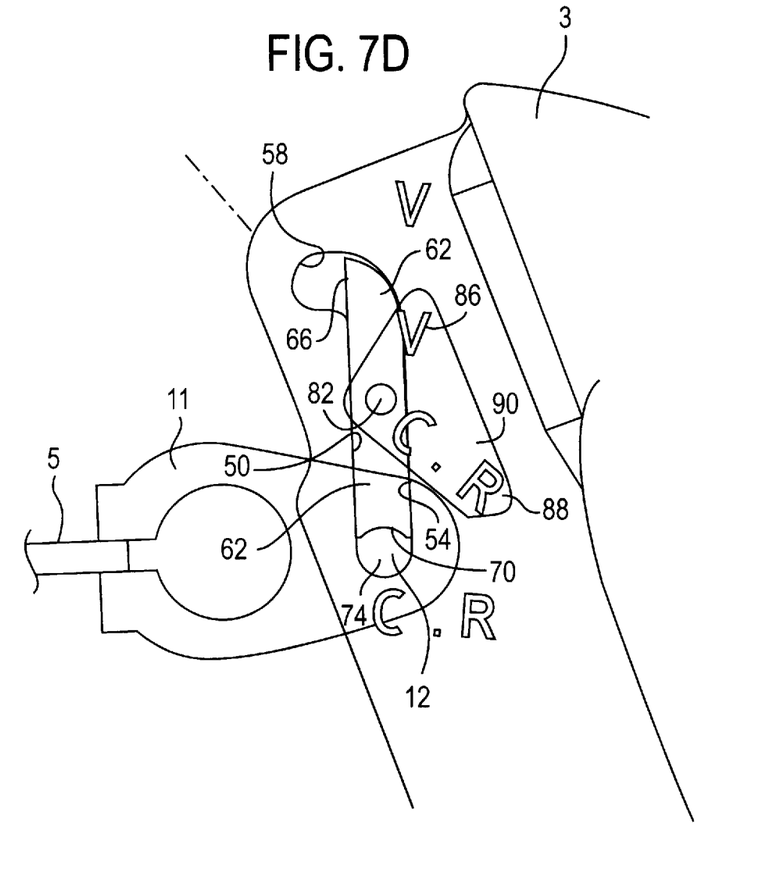

This embodiment is very useful because the same brake lever design may be used with different brake mechanisms. For example, stopper 62 may be removed so that brake lever 3 operates like the previous embodiments, which is advantageous in cantilever or roller brake devices where both large brake shoe spacing and high lever operating forces are desired. When stopper 62 is inserted into slot 50, the brake lever has a set operating force to accommodate users who may dislike variable operating forces or when variable operating forces are not needed. For example, if anchoring member 11 is retained at the upper end of slot 50 as shown in FIG. 7C, then a smaller lever operating force results, which is desirable in brake devices which have long brake arms and the cable pulling force is applied to the ends of the brake arms at right angles to the brake arms. If anchoring member 11 is retained to the lower end of slot 50, as shown in FIG. 7D then a larger lever operating force results, which is desirable in brake devices which have small brake arms or a low mechanical advantage at the brake arms. To facilitate the selection, markings 82 and 84 may be positioned at the upper and lower ends, respectively, of slot 50. Similar markings 86 and 88 may be positioned on an optional retaining tab 90 which may mate with screw 78 to sandwich stopper 62 within slot 50. Such markings help to ensure that stopper 62 is assembled by the user correctly within slot 50. Of course, such markings may be made directly on the stopper 62, if desired.

While the above is a description of various embodiments of the present invention, further modifications may be employed without departing from the spirit and scope of the present invention. For example, in the embodiments described above, the system was designed so that the final position of the wire anchoring member in the brake operating process was adjusted. However, it would also be possible to adjust the initial position of the wire anchoring member. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle brake operating device for operating a force transmission element that is used to control a brake device, the bicycle brake operating device comprising:

a bracket for attachment to the bicycle;

an operating lever pivotally supported on the bracket about a pivot point;

a guide having a path that extends toward the pivot point;

an anchoring member connected to the force transmission element and disposed for movement along the path of the guide during operation of the operating lever; and an adjustment mechanism which is used to adjust a range of movement of the anchoring member along the path of the guide.

2. The device according to claim 1 wherein the adjustment mechanism comprises a screw disposed along the path of the guide.

3. The device according to claim 1 wherein the adjustment mechanism comprises a stopper disposed along the path of the guide.

4. The device according to claim 3 wherein the stopper comprises a resilient member.

5. The device according to claim 1 wherein the path of the guide extends radially outwardly from the pivot point along a straight axis.

6. The device according to claim 5 wherein the operating lever pivots between a first lever position and a second lever position, wherein an angle formed by the axis and the force transmission element is an obtuse angle when the operating lever is disposed in the first lever position, and wherein the angle formed by the axis and the force transmission element is an acute angle when the operating lever is disposed in the second lever position.

7. The device according to claim 6 wherein the anchoring member is disposed in a first guide position when the operating lever is disposed in the first lever position, wherein the anchoring member is disposed in a second guide position when the operating lever is disposed in the second lever position, and wherein the anchoring member immediately moves from the first guide position to the second guide position when the angle formed by the axis and the force transmission element changes from an obtuse angle to an acute angle.

8. The device according to claim 1 wherein the adjustment mechanism comprises:

a cover for positioning over the guide, the cover including a plurality of positioning locations; and a stopper for placement at a selected positioning location for limiting movement of the anchoring member along the path of the guide.

9. The device according to claim 8 wherein the cover defines a plurality of positioning grooves for forming the plurality of positioning locations, and wherein the stopper comprises a pin which may be selectively placed into one of the positioning grooves.

10. The device according to claim 1 wherein the operating lever defines an opening for forming the guide.

11. The device according to claim 1 wherein the operating lever defines a slot which extends radially outwardly from the pivot point for forming the guide.

12. The device according to claim 11 wherein the adjustment mechanism comprises a screw disposed in the slot.

13. The device according to claim 12 wherein the slot extends in a straight line, and wherein the screw is threaded into the operating lever along an axis of the slot so that an end of the screw extends into the slot.

14. The device according to claim 13 wherein the operating lever pivots between a first lever position and a second lever position, wherein an angle formed by the axis and the force transmission element is an obtuse angle when the operating lever is disposed in the first lever position, wherein the angle formed by the axis and the force transmission element is an acute angle when the operating lever is disposed in the second lever position, wherein the anchoring member is disposed in a first guide position when the operating lever is disposed in the first lever position, wherein the anchoring member is disposed in a second guide position when the operating lever is disposed in the second lever position, and wherein the anchoring member immediately moves from the first guide position to the second guide position when the angle formed by the axis and the force transmission element changes from an obtuse angle to an acute angle.

15. The device according to claim 11 wherein the adjustment mechanism comprises a stopper disposed in the slot.

16. The device according to claim 15 wherein the stopper is removably disposed in the slot.

17. The device according to claim 16 wherein the operating lever pivots between a first lever position and a second lever position, wherein an angle formed by the axis and the force transmission element is an obtuse angle when the operating lever is disposed in the first lever position, wherein the angle formed by the axis and the force transmission element is an acute angle when the operating lever is disposed in the second lever position, wherein the anchoring member is disposed in a first guide position when the operating lever is disposed in the first lever position, wherein the anchoring member is disposed in a second guide position when the operating lever is disposed in the second lever position, and wherein the anchoring member immediately moves from the first guide position to the second guide position when the angle formed by the axis and the force transmission element changes from an obtuse angle to an acute angle.

18. The device according to claim 15 wherein the stopper comprises a resilient member.

19. The device according to claim 15 wherein the stopper defines a first retaining opening at a first end of the slot for retaining the brake cable to the first end of the slot.

20. The device according to claim 19 wherein the stopper defines a second retaining opening at a second end of the slot for retaining the brake cable to the second end of the slot.

21. The device according to claim 19 further comprising a fastener for retaining the stopper within the slot.

22. The device according to claim 15 wherein the slot is inclined relative to an axis extending radially from the pivot point.

23. The device according to claim 15 wherein the slot includes a straight first slot portion and an angled second slot portion.

24. The device according to claim 23 wherein the angled slot portion is disposed at an end of the first slot portion.

25. The device according to claim 24 wherein the stopper is disposed in the first slot portion and defines with the second slot portion a retaining opening for retaining the brake cable in the second slot portion.

26. The device according to claim 11 wherein the adjustment mechanism comprises:

a cover for positioning over the slot, the cover including a plurality of positioning grooves; and a pin for placement at a selected positioning groove for limiting movement of the anchoring member along the slot.

27. A bicycle brake operating device for operating a force transmission element that is used to control a brake device, the bicycle brake operating device comprising:

a bracket for attachment to the bicycle;

an operating lever pivotally supported on the bracket about a pivot point;

a guide having a path that extends toward the pivot point;

an anchoring member connected to the force transmission element and disposed for free movement along the path of the guide during operation of the operating lever;

wherein the anchoring member is disposed in an upper location of the guide when the operating lever is disposed in an initial position; and wherein the guide is structured so that the anchoring member remains substantially at the upper location of the guide during movement of the lever until the lever moves to a selected position and then instantaneously moves from the upper location to a lower location of the guide when the operating lever reaches the selected position.

28. The device according to claim 27 wherein the operating lever pivots between a first lever position and a second lever position, wherein an angle formed by the force transmission element and an axis extending from the pivot point to a point of coupling of the anchoring member to the operating lever is an obtuse angle when the operating lever is disposed in the first lever position, wherein the angle formed by the axis and the force transmission element is an acute angle when the operating lever is disposed in the second lever position, wherein the anchoring member is disposed in a first guide position when the operating lever is disposed in the first lever position, wherein the anchoring member is disposed in a second guide position when the operating lever is disposed in the second lever position, and wherein the anchoring member immediately moves from the first guide position to the second guide position when the angle formed by the axis and the force transmission element changes from an obtuse angle to an acute angle.

29. The device according to claim 27 wherein the upper location is an upper end of the guide, and wherein the lower location is a lower end of the guide.

30. The device according to claim 27 wherein the operating lever defines a slot which forms the guide.

* * * * *